No. 828,811. PATENTED AUG. 14, 1906.
A. BREMBERG.
GUN MOUNTING.
APPLICATION FILED SEPT. 10, 1904.
7 SHEETS—SHEET 4.
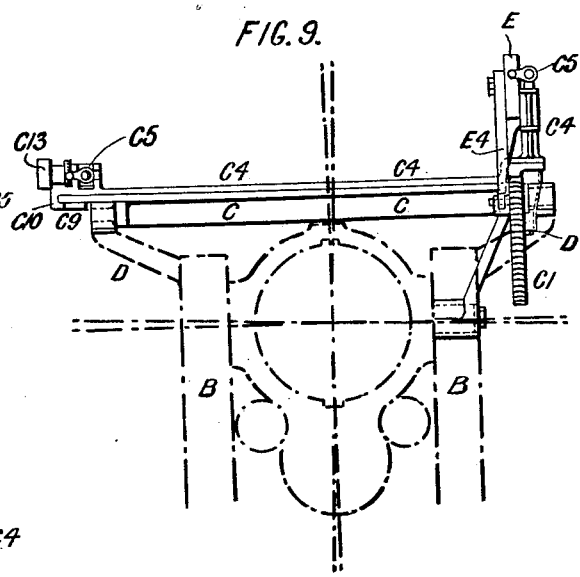
FIG. 8.
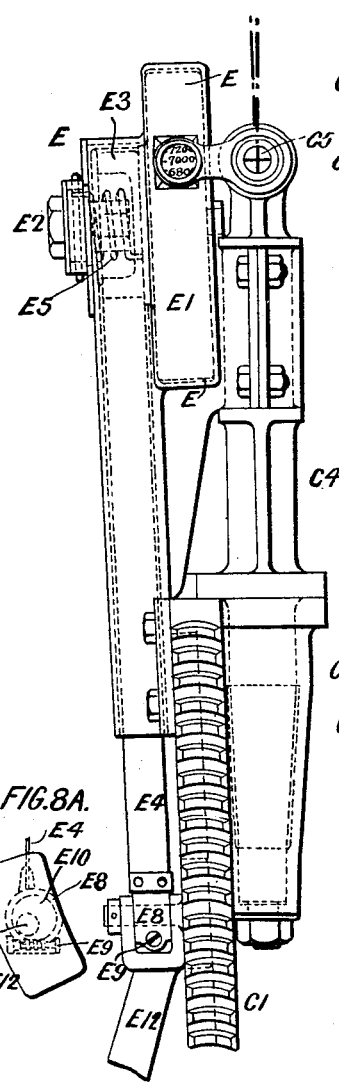
FIG. 8A.
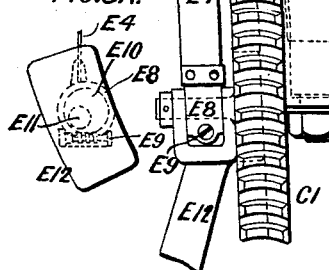
FIG. 10.
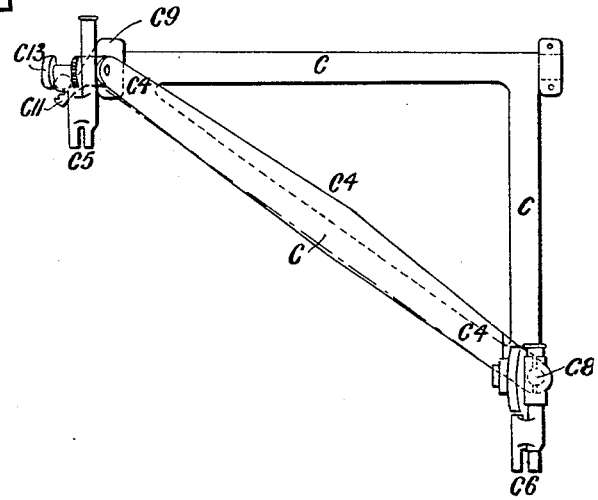
WITNESSES:
F. W. Wright
P. H. Buckhead
INVENTOR
Axel Bremberg
BY Howson & Howson
ATTORNEYS.

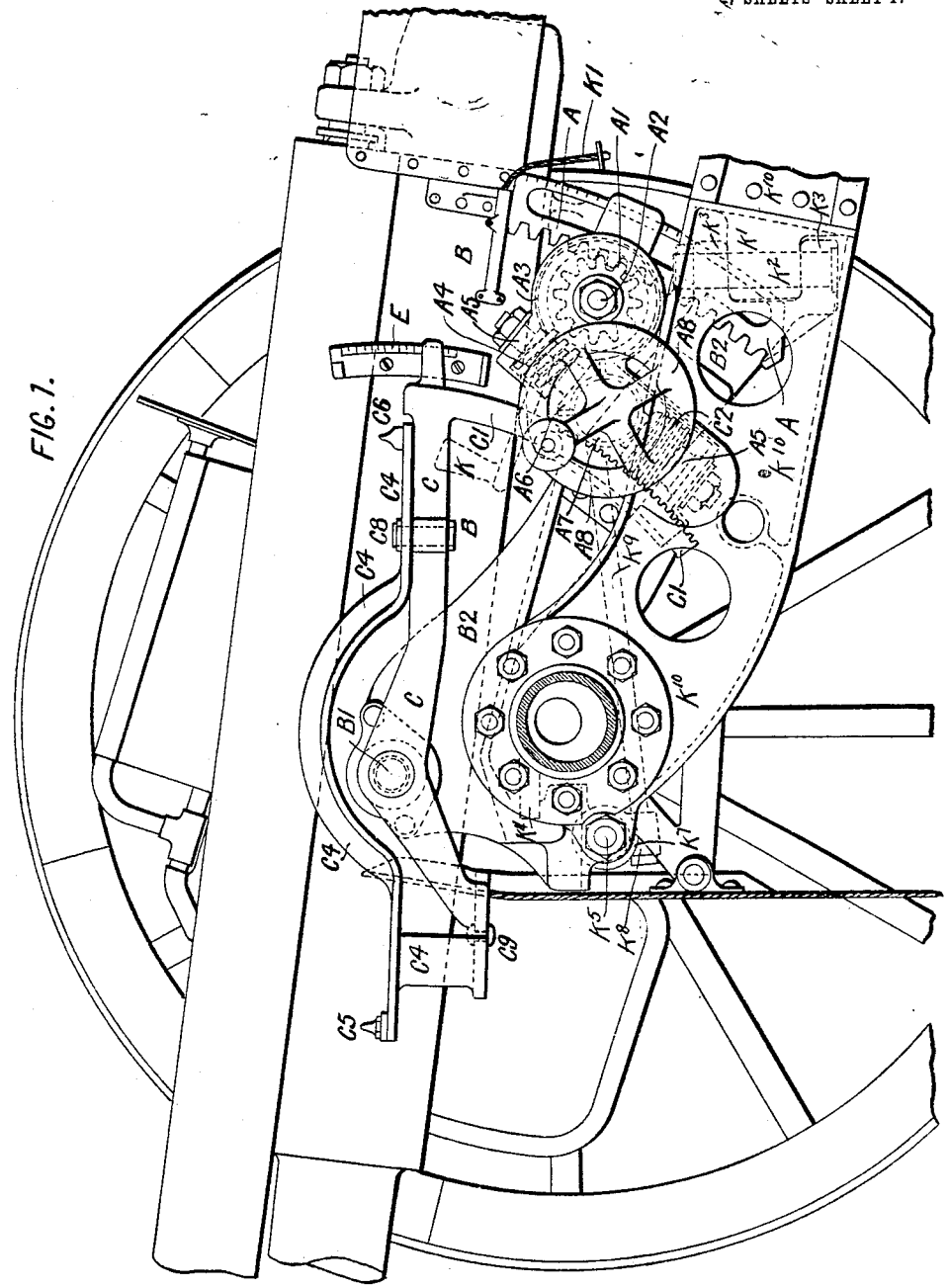

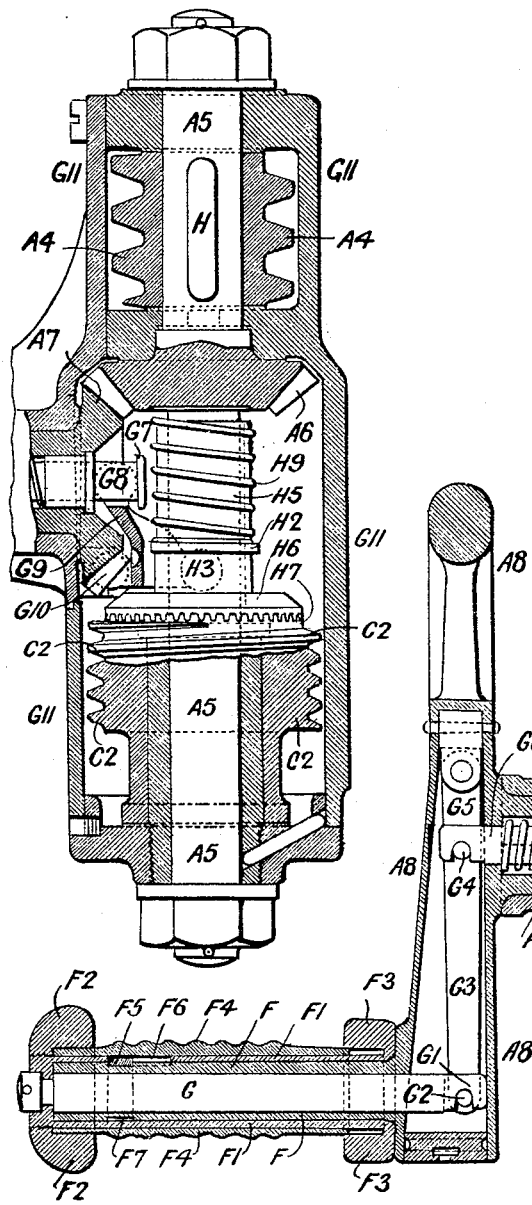
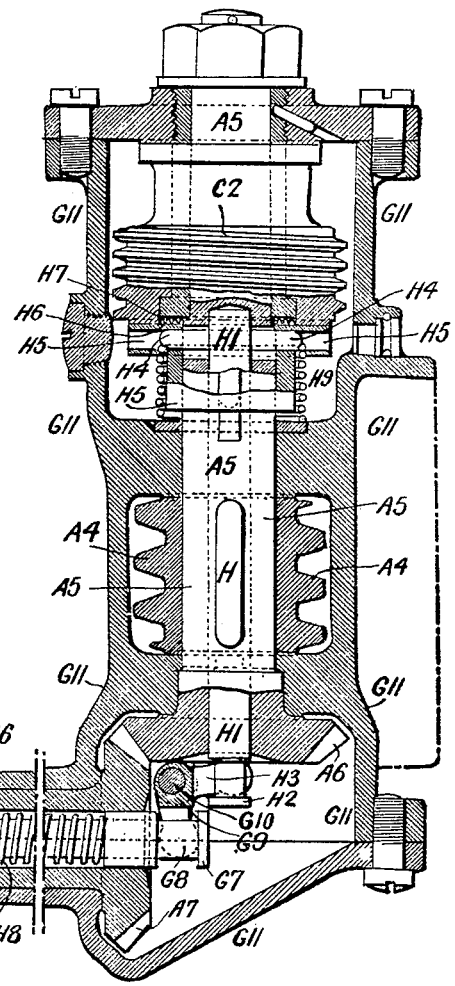
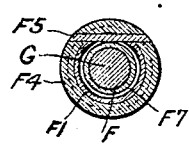

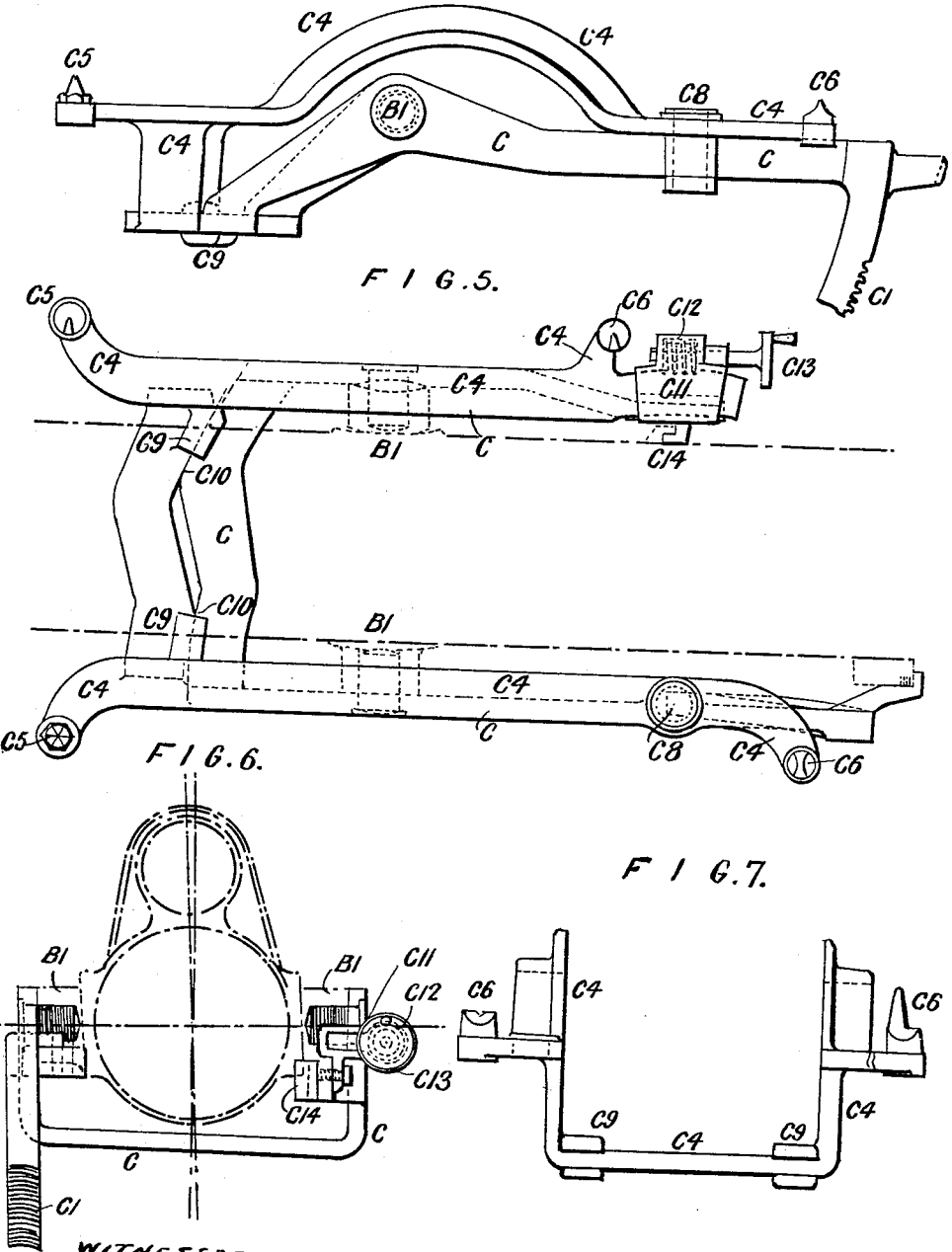

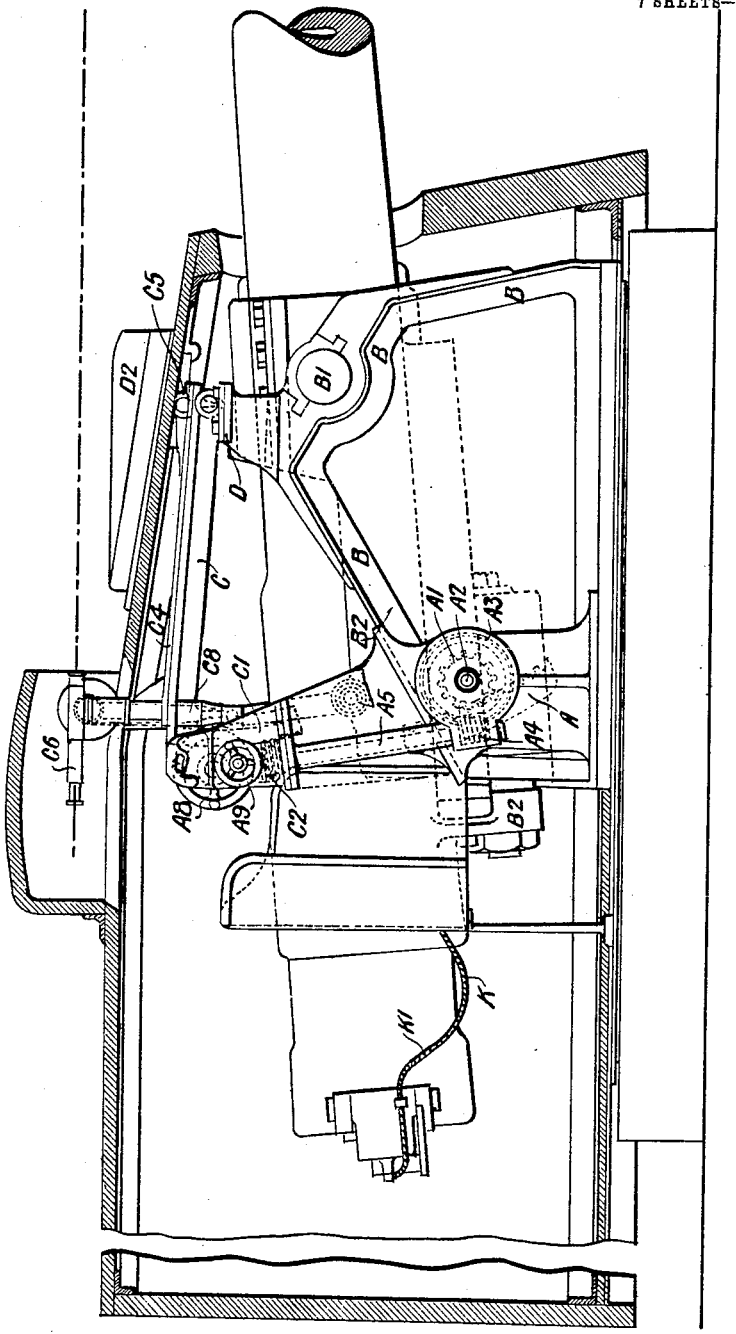

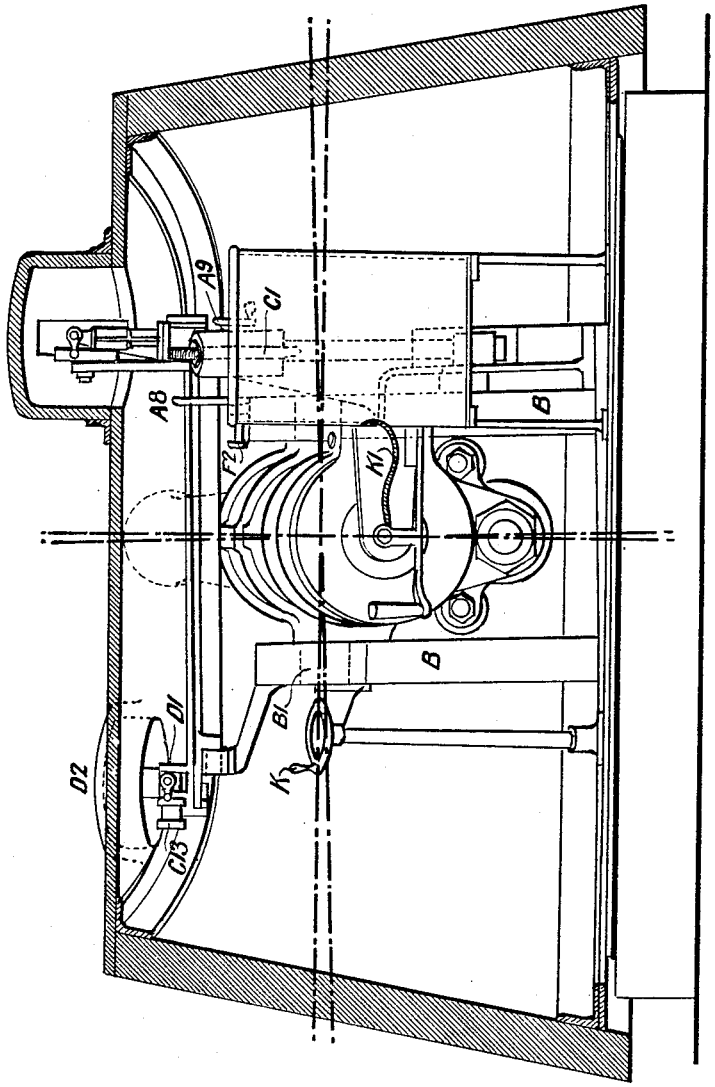

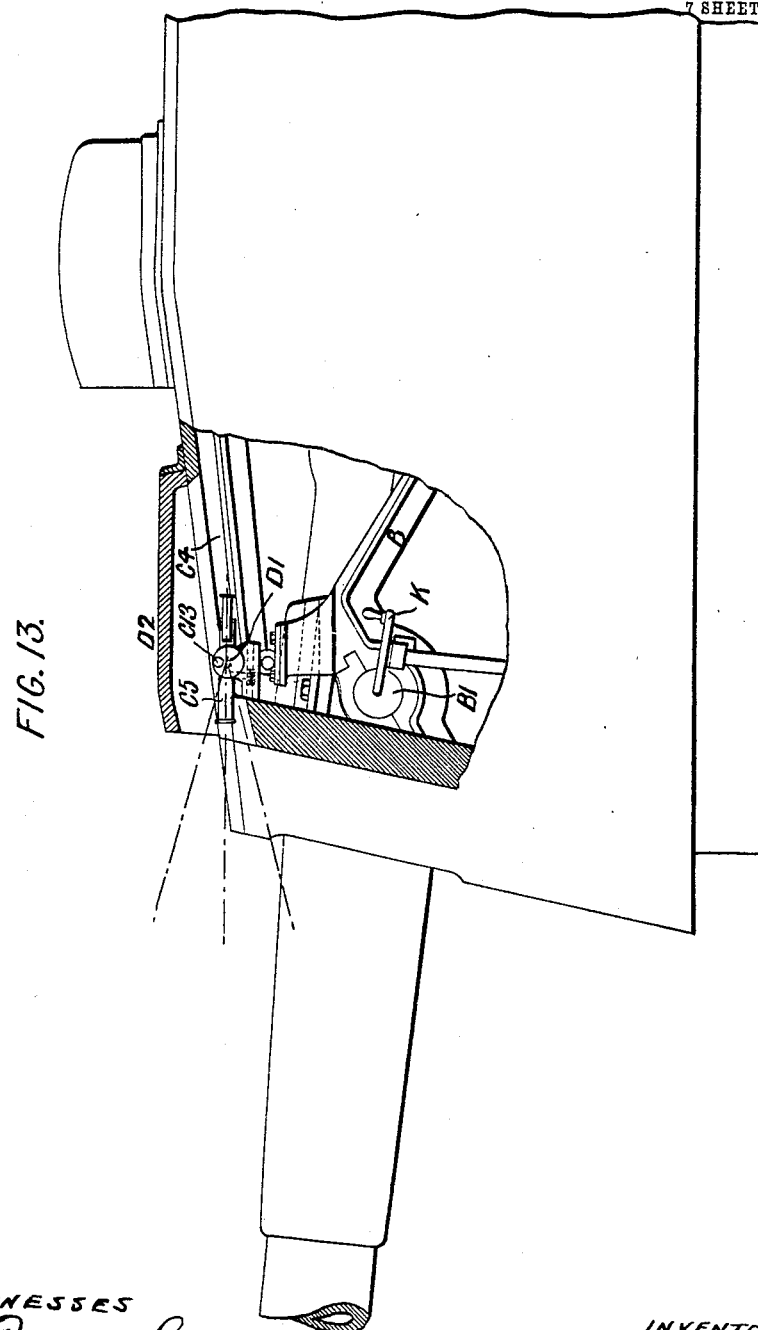

UNITED STATES PATENT OFFICE.

AXEL BREMBERG, OF GLASGOW, SCOTLAND.

GUN-MOUNTING.

No. 823,811.   Specification of Letters Patent.   Patented Aug. 14, 1906.

Application filed September 10, 1904. Serial No. 223,985.

*To all whom it may concern:*

Be it known that I, AXEL BREMBERG, a subject of the King of Sweden, and a resident of Glasgow, Scotland, (whose postal address is 2 Sutherland Terrace, Hillhead, Glasgow, Scotland,) have invented certain new and useful Improvements in Gun-Mountings, of which the following is a specification.

The said invention relates to gun-mountings, and has for its object to improve and simplify the construction and operation of the elevating, sighting, and range-adjusting gear, so that these gears can be expeditiously operated and the gun and sight together laid on the object aimed at, and also so that the gun can be independently either elevated or depressed without disturbing the line of sight.

In order that the invention and the manner of performing the same may be properly understood, I hereunto append seven sheets of explanatory drawings, throughout which like reference - numerals indicate similar parts, and in which—

Figure 1, Sheet 1, is an elevation of a field-gun as made according to my invention; Figs. 2, 3, and $3^A$, Sheet 2, detail views of elevating and sighting gear. Figs. 4, 5, 6, and 7, Sheet 3, are detail views of sight mechansim. Fig. 8, Sheet 4, is an elevation of a range - indicating device, Fig. $8^A$ being a view of a detail of same, while Figs. 9 and 10 are detail views of sight mechanism. Figs 11 and 12, Sheets 5 and 6, are respectively side and end elevations of a naval gun fitted with the improvements, while Fig. 13, Sheet 7, is a side elevation of part of the same gun, showing a detail of sight mechanism.

In carrying out the invention as applied to a field-gun shown in Fig. 1 of the accompanying drawings there is provided a toothed elevating-arc A, secured to the cradle B of the gun and struck to a radius from the center of the cradle-trunnions $B'$. An elevating-pinion $A'$ gears with this arc A and is keyed to a shaft $A^2$, carried in bearings in the carriage $B^2$. On this shaft $A^2$ there is a worm-wheel $A^3$, which gears with a worm $A^4$ and is connected to the elevating-pinion by the usual friction-clutch. The worm $A^4$ is on the shaft $A^5$, carried in bearings in the carriage $B^2$, and this shaft has also on it a second worm $C^2$, gearing with teeth cut on a sighting-arc $C'$, struck to the radius of the trunnions $B'$. Upon the shaft $A^5$ there is also a bevel-pinion $A^6$, gearing with a bevel-pinion $A^7$, connected with an elevating hand-wheel $A^8$. The gearing is such that while the elevating hand-wheel $A^8$ is always directly connected to the worm $A^4$, operating the elevating-gear, it may be connected to or disconnected from the worm $C^2$, operating the sighting-arc $C'$, by clutch mechanism, the gearing and clutch mechanism being shown separately and to an enlarged scale in Fig. 2, Sheet 2, an alternative arrangement being shown in Fig. 3.

The handle of the elevating hand-wheel $A^8$ is made in three parts, Figs. 3, $3^A$—an inner hollow part F, formed on the hand-wheel $A^8$, a loose sleeve $F'$, having collars $F^2$ $F^3$ at each end, and an outer cover $F^4$, externally corrugated to afford a firm grip. The outer cover is fixed to the inner hollow part F by a pin $F^5$, passing through a slot $F^6$ in the sleeve $F'$ and engaging a groove $F^7$ in the part F, as shown in section in Fig. $3^A$. The slot $F^6$ in the sleeve permits of endwise movement of the sleeve between the cover $F^4$ and part F, while at the same time the cover is prevented from endwise movement by the pin engaging it and the groove $F^7$ in the hollow part F. A spindle G is attached to the sleeve $F'$ and has upon its end a jaw $G'$, engaging a pin $G^2$ in one end of a lever $G^3$, centered within the hand - wheel $A^8$, which in this modification is hollow. The lever $G^3$ has on it a second pin $G^4$, engaging a jaw $G^5$ in a spring-controlled rod $G^6$, engaging by a collar $G^7$ at its other end one arm $G^8$ of a bell-crank lever $G^9$, centered on a pin $G^{10}$ in the casing $G^{11}$ of the gearing.

The shaft $A^5$, carrying, as hereinbefore described, the elevating - worm $A^4$, which is fixed to it by a key H, and the sighting-worm $C^2$, which is loose upon the shaft, is made hollow and has within it a rod or plunger $H'$, having at its lower end a collar $H^2$, engaged by the other arm $H^3$ of the bell-crank lever $G^9$. The upper end of this plunger $H'$ has in it a cotter $H^4$, extending out through slots cut in the shaft $A^5$ and engaging recesses in a sleeve $H^5$, sliding on a feather on the shaft $A^5$ and carrying on its end one member $H^6$ of an ordinary serrated clutch. The other member $H^7$ of this clutch is formed on the sighting-worm $C^2$, and the two members of the clutch are normally kept in engagement by a spring $H^8$. It will be seen that the sighting-worm $C^2$ thus normally turns with the shaft $A^5$, but that it can be freed from that shaft by pulling the sleeve $F'$ of the hand-wheel handle outward, (against the action of the springs $H^8$ $H^9$ through the rocking lever $G^3$, plunger $G^6$, bell-crank lever $G^9$, and plunger $H'$.) The hand firmly gripping the outer cover and bearing on the outer collar prevents the sleeve when pulled out from slipping back by the pull of the springs.

The hand-wheel $A^8$ has connected to it a bevel-pinion $A^7$, gearing with a bevel-pinion $A^6$, formed on the end of the shaft $A^5$, and it will be seen that the gunner can therefore either operate both elevating and sighting worms together or by pulling out the sleeve $F'$, as described, move only the elevating-worm $A^4$, as desired. The proportion between the pitches of the elevating and sighting worms are such that the same amount of elevation or depression is given to the gun and sight bracket by the hand-wheel when these worms are connected by the clutch, as described.

The traversing mechanism of the gun is of ordinary and well-known form, the carriage $B^2$ being supported at its rear end upon a lug $K'$, formed on a lower carriage and trail $K^{10}$ and being hinged on a vertical pin $K^2$, passing through that lug and through lugs $K^3$, which are formed on the rear end of the carriage $B^2$. The forward end of the carriage $B^2$ engages a guide $K^4$, struck to a radius from the pin $K^2$, fixed to the lower carriage $K^{10}$, and the carriage $B^2$ is laterally traversed along this curved guide and turned about the pin $K^2$ by a nut on it engaging a transverse screwed shaft $K^5$, carrying a worm-wheel $K^7$, with which there engages a worm $K^8$, carried on a shaft $K^9$ and operated through bevel-gearing by a hand-wheel K, there being no novelty *per se* in this part of the structure.

Fig. 2 shows the arrangement as applied to the field-gun shown in Fig. 1 and slightly differing from the arrangement shown in Fig. 3, the elevating-worm $A^4$ and the sighting-worm $C^2$ being in it arranged at opposite ends of the shaft $A^5$, with the clutch mechanism for connecting the sighting-worm $C^2$ to or disconnecting it from that shaft arranged close to the hand-wheel $A^8$ and near the center of the shaft. With this arrangement the plunger $H'$ is dispensed with and the clutch member $H^6$ operated directly by the bell-crank arms $H^3$, engaging a collar $H^2$ thereon. A further variation is applied to the naval gun shown in Figs. 11, 12, and 13, Sheets 5, 6, and 7, and a still further variation being made by arranging on that gun a second hand-wheel for operating the sighting-worm independently by bevel or other gearing.

The details of the sight mechanism as applied to this gun are shown separately in side elevation in Fig. 4, in plan in Fig. 5, and in end elevation in Figs. 6 and 7, Sheet 3, and consist of a sight-bracket C, carrying the elevating-arc $C'$ and centered upon the cradle-trunnions $B'$. This bracket is of somewhat horseshoe shape in plan, Fig. 5, and extends along both sides of the gun. Pivoted on a pin $C^8$ in this bracket is a duplex sight-bar $C^4$ of similar shape, similarly extending on both sides of the gun and carrying pairs of sights $C^5$ $C^6$, the left-hand pair of which are used for elevating, while the right-hand pair are used exclusively for traversing. The forward end of the sight-bar $C^4$ is carried by parts $C^9$, engaging guides $C^{10}$, formed upon the forward end of the sight-bracket and struck to radii from the pivot $C^8$, about which the sight-bar $C^4$ turns. In order to turn the sight-bar about this pivot, it has cut upon it worm-teeth $C^{11}$, struck to a radius from the pivot and engaged by a worm $C^{12}$, carried on the sight-bracket C and provided with a hand-wheel $C^{13}$ for turning it. Guides $C^{14}$ may be provided for the sight-bracket C on the right-hand side of the cradle, if required.

The range may be shown upon an indicator E, Fig. 1, of ordinary form, or the improved indicator (shown as applied to the naval gun in Figs. 11 and 12 and in detail and to an enlarged scale in elevation in Figs 8 and $8^A$, Sheet 4) may be used, consisting of a cylinder E, having the range indications marked upon its surface. The cylinder E is inclosed in a cylindrical box $E'$, attached to the sight-bracket C, the box being formed with an aperture through which the range corresponding to the angle of tangent elevation will appear. The cylinder E is carried on a shaft $E^2$ in the box $E'$, the shaft carrying also a drum or cam $E^3$, which is rotated by a steel band $E^4$, (or it might be an equivalent device, such as a rack and pinion.) A spring $E^5$ is provided within the cylinder E and encircling the shaft $E^2$, so as to keep a tension upon the band $E^4$. In order that the band $E^4$ may be adjusted, its end is attached to a ring $E^8$, carrying a screwed pin $E^9$, gearing with an eccentric $E^{10}$, having teeth cut in its periphery and carried upon a pin $E^{11}$ in a bracket $E^{12}$, formed in one end of a link, which link is hinged to the cradle. Compensation for drift is obtained in this case preferably by arranging the axis of the sight-brackets C and of the trunnions $B'$ at an angle of about two degrees to the horizontal, as indicated in Figs. 6 and 8. The traversing and deflection are in this case given entirely to the man on the right side, the gear for traversing being of the ordinary form and operated by a handle K, and range-setting, laying, and firing to the captain of the gun, so that therefore the latter's left hand can always be on the elevating-wheel $A^8$ and his right hand on the firing-lanyard $K'$. As the range-indicator E is quite close to the rear sight, the gun captain need never, practically speaking, take his eye away from the object aimed at.

The application of the improvements to a naval gun is shown in Figs. 11, 12, and 13, the combined elevating and sighting gear being substantially similar to that described with reference to the field-gun and shown in detail in Figs. 2, 3, and 3ᴬ, the gun-cradle B, having upon it an elevating-arc A, gearing with a pinion A' on a shaft A² in the carriage. The shaft A² has on it a worm-wheel A³, connected to the pinion A' by the usual friction device. With the worm-wheel A³ there gears a worm A⁴ on a shaft A⁵, having also on it a worm C², gearing with the sighting-arc C', the two worms A⁴ C² being operated through clutch mechanism of the type described with reference to Figs. 2 and 3 by a hand-wheel A⁸, a subsidiary hand-wheel A⁹ being also provided to independently operate the sighting-worm C². The sighting mechanism is substantially of the type described with reference to Figs. 4, 5, 6, and 7 and is shown in detail in end elevation in Fig. 9 and in plan in Fig. 10, Sheet 4, and comprises a sight-bracket C, attached at its rear end to the sighting-arc C' and carried at its fore end on a bracket D, secured to the carriage B. Fulcrumed on a pin C⁸ is a sight-bar C⁴, carrying on it telescope-sights C⁵ C⁶, that on the right being for elevating and that on the left for traversing, the traversing telescope C⁵ being arranged in the manner hereinafter described. The sight-bar C⁴ is movable about the pivot C⁸ in the sight-bracket C for traversing and deflection by a hand-wheel C¹³, Figs. 9, 10, 12, and 13, operating-gearing engaging a toothed sector C¹¹, cut on the fore end of the sight-bracket and struck to a radius from the pivot C⁸. The traversing telescope C⁵ is carried upon a horizontal or nearly-horizontal pivot D' upon the sight-bar C⁴ and so as to be free to move vertically, so that the operator of the traversing gear K can keep it upon the object sighted, notwithstanding the relative vertical displacement of the object due to rolling of the ship. This telescope C⁵ is arranged forward and practically over the trunnions B', about which the gun turns, and it has thus little vertical movement, so allowing of its being arranged within a separate hood D², Figs. 12 and 13, in the barbette without greatly adding to the latter's vulnerability. In this case the traversing and deflecting are given to the man on the left side and the range-setting, laying, and firing to the captain of the gun on the right side, compensation for drift being obtained, as in the case of the field-gun, by arranging the axis of the sight-brackets C and of the trunnions B' at an angle of about two degrees to the horizontal, as indicated in Figs. 9 and 12.

What I claim as my invention is—

1. In gun-mountings, in combination with the cradle and carriage thereof; elevating and sighting gear comprising a toothed elevating-arc on the cradle, a pinion gearing therewith, a shaft in the carriage and carrying the pinion, an elevating worm-wheel on the shaft, a worm-shaft, a worm fixed thereon and gearing with the elevating worm-wheel, a toothed sighting-arc, a sighting-worm loose on the worm-shaft and gearing therewith, a hand-wheel operatively connected to the elevating-worm, clutch mechanism for connecting the hand-wheel to, or disconnecting it from the sighting-worm, and a handle on the hand-wheel for operating the clutch mechanism; a sight-bracket pivoted to the carriage and carrying the sighting-arc, a duplex sight-bar pivoted thereon, means for moving the sight-bar about the pivot on the sight-bracket, and telescope-sights on the sight-bar, one of the telescope-sights being horizontally pivoted thereto; and a range-indicator operatively connected to the sight-bracket and to the carriage and comprising a spring-controlled range-indicating drum carried on the sight-bracket, a cam connected thereto and a band upon the cam and attached to the carriage, as described.

2. In gun-mountings, in combination with the cradle and carriage thereof; elevating and sighting gear comprising a toothed elevating-arc on the cradle, a pinion gearing therewith, a shaft in the carriage and carrying the pinion, an elevating worm-wheel on the shaft, a worm-shaft, a worm fixed thereon and gearing with the elevating worm-wheel, a toothed sighting-arc, a sighting-worm loose on the worm-shaft and gearing therewith, a hand-wheel operatively connected to the elevating-worm, clutch mechanism for connecting the hand-wheel to, or disconnecting it from the sighting-worm, and a handle on the hand-wheel for operating the clutch mechanism; a sight-bracket pivoted to the carriage and carrying the sighting-arc, a duplex sight-bar pivoted thereon, and telescope-sights on the sight-bar, one of the telescope-sights being horizontally pivoted, as described.

3. In gun-mountings, in combination with the cradle and carriage thereof; elevating and sighting gear comprising a toothed elevating-arc on the cradle, a pinion gearing therewith, a shaft in the carriage and carrying the pinion, an elevating worm-wheel on the shaft; a worm-shaft, a worm fixed thereon and gearing with the elevating worm-wheel, a toothed sighting-arc, a sighting-worm loose on the worm-shaft and gearing therewith, a hand-wheel operatively connected to the elevating-worm, clutch mechanism for connecting the hand-wheel to, or disconnecting it from the sighting-worm, and a handle on the hand-wheel for operating the clutch mechanism; a sight-bracket pivoted to the carriage and carrying the sighting-arc, and a duplex sight-bar pivoted thereon.

4. In gun-mountings, in combination with the cradle and carriage thereof; elevating and sighting gear comprising a toothed elevating-arc on the cradle, a pinion gearing therewith, a shaft in the carriage and carrying the pinion, an elevating worm-wheel on the shaft; a worm-shaft, a worm fixed thereon and gearing with the elevating worm-wheel, a toothed sighting-arc, a sighting-worm loose on the worm-shaft and gearing therewith, a hand-wheel operatively connected to the elevating-worm, clutch mechanism for connecting the hand-wheel to, or disconnecting it from the sighting-worm, and a handle on the hand-wheel for operating the clutch mechanism and a sight-bracket pivoted to the carriage and carrying the sighting-arc, as described.

5. In gun-mountings, in combination; gear for operating elevating, and sighting mechanism comprising a shaft, a worm fixed thereon, a worm loose thereon, and a hand-wheel operating the shaft, spring-controlled clutch mechanism for connecting the loose worm to, or disconnecting it from the shaft, comprising a clutch, a collar on one member thereof, a two-armed bell-crank lever, one arm of which engages the clutch-collar, a sleeve on the hand-wheel, a handle endwise movable thereon and means for connecting the handle to the other arm of the bell-crank lever, as described.

In testimony whereof I have signed my name to this specification in the presence of two subscribing witnesses.

AXEL BREMBERG.

Witnesses:
 DAVID FERGUSON,
 ALEXANDER SMITH.